US006483870B1

(12) United States Patent
Locklear, Jr. et al.

(10) Patent No.: US 6,483,870 B1
(45) Date of Patent: *Nov. 19, 2002

(54) DATA COMMUNICATION USING A MODIFIABLE NUMBER OF XDSL MODEMS

(75) Inventors: Robert H. Locklear, Jr.; Craig S. Cantrell; Kip R. McClanahan, all of Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,293

(22) Filed: Dec. 6, 1999

Related U.S. Application Data (63) Continuation of application No. 08/951,151, filed on Oct. 15, 1997, now Pat. No. 5,999,565.

(51) Int. Cl.[7] .................................................. H04L 5/16
(52) U.S. Cl. ...................... 375/222; 375/240; 375/257; 370/420; 370/463; 370/468; 370/477; 370/487; 370/490; 379/93.07
(58) Field of Search ................................. 375/220, 222, 375/257, 260, 240; 370/485–490, 468, 477, 463, 430, 419–421, 252; 379/93.01, 93.05, 93.07, 93.14, 93.29

(56) References Cited

U.S. PATENT DOCUMENTS

| | | | |
|---|---|---|---|
| 3,532,827 A | 10/1970 | Ewin | 179/18 |
| 3,821,484 A | 6/1974 | Sternung et al. | 179/18 EB |
| 4,002,849 A | 1/1977 | Kotler et al. | 179/18 EB |
| 4,232,199 A | 11/1980 | Boatright et al. | 179/18 B |
| 4,282,408 A | 8/1981 | Stauers | 179/18 FA |
| 4,438,511 A | 3/1984 | Baran | 370/19 |
| 4,455,646 A | 6/1984 | Bloodworth | 370/66 |
| 4,665,514 A | 5/1987 | Ching et al. | 370/60 |

(List continued on next page.)

FOREIGN PATENT DOCUMENTS

| | | | |
|---|---|---|---|
| JP | 6376648 | 4/1988 | .......... H04L/11/20 |
| WO | WO97/37458 | 10/1997 | |

OTHER PUBLICATIONS

Horst Hessenmuller, et al., Zugangsnetzstrukturen fur interaktive Videodienste (Teil 1), Fernmelde Ingenieur, Der, vol. 48, No. 8, XP000647017, Aug., 1994, Germany, pp. 1–32 (with English translation).

Horst Hessenmuller, et al., Zugangsnetzstrukturen fur interaktive Videodienste (Teil 2), Fernmelde Ingenieur, Der, vol. 48, No. 9, XP000619688, Sep., 1994, Germany, pp. 1–28 (with English translation).

PCT Search Report dated Oct. 14, 1998 in International Application No. PCT/US98/05587.

*Primary Examiner*—Stephen Chin
*Assistant Examiner*—Dac V. Ha
(74) *Attorney, Agent, or Firm*—Baker Botts L.L.P.

(57) ABSTRACT

A communication system includes a number of communication devices coupled to a data network using communication servers. The communication system supports communication sessions between a variety of networks and devices using, at least in part, XDSL communication techniques. Specifically, information associated with a session passes between a device and an associated server using a modifiable number of XDSL modems and associated twisted pair lines.

25 Claims, 6 Drawing Sheets

U.S. PATENT DOCUMENTS

| | | | | |
|---|---|---|---|---|
| 4,679,227 | A | 7/1987 | Hughes-Hartogs | 379/98 |
| 4,731,816 | A | 3/1988 | Hughes-Hartogs | 379/98 |
| 4,757,495 | A | 7/1988 | Decker et al. | 370/76 |
| 4,782,512 | A | 11/1988 | Hutton | 379/98 |
| 4,803,720 | A | 2/1989 | Newell et al. | 379/202 |
| 4,833,706 | A | 5/1989 | Hughes-Hartogs | 379/98 |
| 4,980,897 | A | 12/1990 | Decker et al. | 375/38 |
| 4,985,889 | A | 1/1991 | Frankish et al. | 370/94.1 |
| 5,025,469 | A | 6/1991 | Bingham | 379/98 |
| 5,054,034 | A | 10/1991 | Hughes-Hartogs | 375/8 |
| 5,119,402 | A | 6/1992 | Ginzburg et al. | 375/17 |
| 5,119,403 | A | 6/1992 | Krishnan | 375/39 |
| 5,134,611 | A | 7/1992 | Steinka et al. | 370/79 |
| 5,185,763 | A | 2/1993 | Krishnan | 735/39 |
| 5,198,818 | A | 3/1993 | Samueli et al. | 341/144 |
| 5,202,884 | A | 4/1993 | Close et al. | 370/94.1 |
| 5,206,886 | A | 4/1993 | Bingham | 375/97 |
| 5,210,530 | A | 5/1993 | Kammerer et al. | 340/825.08 |
| 5,214,650 | A | 5/1993 | Renner et al. | 370/110.1 |
| 5,222,077 | A | 6/1993 | Krishnan | 375/39 |
| 5,228,062 | A | 7/1993 | Bingham | 375/97 |
| 5,247,347 | A | 9/1993 | Litteral et al. | 358/85 |
| 5,282,155 | A | 1/1994 | Jones | 364/724.19 |
| 5,285,474 | A | 2/1994 | Chow et al. | 375/13 |
| 5,293,402 | A | 3/1994 | Crespo et al. | 735/14 |
| 5,295,159 | A | 3/1994 | Kerpez | 735/38 |
| 5,331,670 | A | 7/1994 | Sorbara et al. | 375/111 |
| 5,337,348 | A | 8/1994 | Yamazaki et al. | 379/94 |
| 5,339,355 | A | 8/1994 | Mori et al. | 379/94 |
| 5,341,474 | A | 8/1994 | Gelman et al. | 395/200 |
| 5,345,437 | A | 9/1994 | Ogawa | 370/13 |
| 5,367,540 | A | 11/1994 | Kakuishi et al. | 375/103 |
| 5,371,532 | A | 12/1994 | Gelman et al. | 348/7 |
| 5,379,441 | A | 1/1995 | Wantanabe et al. | 395/800 |
| 5,390,239 | A | 2/1995 | Morris et al. | 379/93 |
| 5,400,322 | A | 3/1995 | Hunt et al. | 370/19 |
| 5,404,388 | A | 4/1995 | Eu | 379/24 |
| 5,408,260 | A | 4/1995 | Arnon | 348/6 |
| 5,408,522 | A | 4/1995 | Ikehata et al. | 379/98 |
| 5,408,527 | A | 4/1995 | Tsutsu | 379/211 |
| 5,408,614 | A | 4/1995 | Thornton et al. | 395/275 |
| 5,410,264 | A | 4/1995 | Lechleider | 327/311 |
| 5,410,343 | A | 4/1995 | Coddington et al. | 348/7 |
| 5,412,660 | A | 5/1995 | Chen et al. | 370/110.1 |
| 5,414,455 | A | 5/1995 | Hooper et al. | 348/7 |
| 5,414,733 | A | 5/1995 | Turner | 375/233 |
| 5,422,876 | A | 6/1995 | Turudic | 370/15 |
| 5,426,634 | A | 6/1995 | Cote et al. | 370/58.2 |
| 5,428,608 | A | 6/1995 | Freeman et al. | 370/60.1 |
| 5,440,335 | A | 8/1995 | Beveridge | 348/13 |
| 5,442,390 | A | 8/1995 | Hooper et al. | 348/7 |
| 5,444,703 | A | 8/1995 | Gagliardi et al. | 370/60.1 |
| 5,452,306 | A | 9/1995 | Turudic et al. | 370/110.1 |
| 5,453,779 | A | 9/1995 | Dan et al. | 348/7 |
| 5,461,415 | A | 10/1995 | Wolf et al. | 348/7 |
| 5,461,616 | A | 10/1995 | Suzuki | 370/79 |
| 5,461,640 | A | 10/1995 | Gatherer | 375/231 |
| 5,469,495 | A | 11/1995 | Beveridge | 379/56 |
| 5,475,735 | A | 12/1995 | Williams et al. | 379/59 |
| 5,477,263 | A | 12/1995 | O'Callaghan et al. | 348/7 |
| 5,479,447 | A * | 12/1995 | Chow et al. | 370/468 |
| 5,495,483 | A | 2/1996 | Grube et al. | 370/95.1 |
| 5,513,251 | A | 4/1996 | Rochkind et al. | 379/93 |
| 5,517,488 | A | 5/1996 | Miyazaki et al. | 370/16 |
| 5,528,585 | A | 6/1996 | Cooley et al. | 370/56 |
| 5,546,379 | A | 8/1996 | Thaweethai et al. | 370/17 |
| 5,553,135 | A | 9/1996 | Xing | 379/399 |
| 5,574,724 | A | 11/1996 | Bales et al. | 370/68.1 |
| 5,583,872 | A | 12/1996 | Albrecht et al. | 370/476 |
| 5,594,727 | A | 1/1997 | Kolbenson et al. | 370/442 |
| 5,594,732 | A | 1/1997 | Bell et al. | 370/401 |
| 5,598,406 | A | 1/1997 | Albrecht et al. | 370/296 |
| 5,602,902 | A | 2/1997 | Satterlund et al. | 379/59 |
| 5,604,741 | A | 2/1997 | Samueli et al. | 370/402 |
| 5,631,897 | A | 5/1997 | Pacheco et al. | 370/237 |
| 5,659,542 | A | 8/1997 | Bell et al. | 370/496 |
| 5,668,857 | A | 9/1997 | McHale et al. | 379/93.07 |
| 5,678,004 | A | 10/1997 | Thaweethai | 595/187.01 |
| 5,687,176 | A | 11/1997 | Wisniewski et al. | 370/476 |
| 5,737,364 | A | 4/1998 | Cohen et al. | 375/220 |
| 5,756,280 | A | 5/1998 | Soora et al. | 455/4.2 |
| 5,770,950 | A | 6/1998 | Zurcher et al. | 326/30 |
| 5,781,617 | A | 7/1998 | McHale et al. | 379/93.14 |
| 5,799,017 | A | 8/1998 | Gupta et al. | 370/419 |
| 5,809,422 | A | 9/1998 | Raleigh et al. | 455/449 |
| 5,812,786 | A | 9/1998 | Seazholtz et al. | 395/200.63 |
| 5,838,683 | A | 11/1998 | Corley et al. | 370/408 |
| 5,852,655 | A | 12/1998 | McHale et al. | 379/93.14 |
| 5,901,205 | A * | 5/1999 | Smith et al. | 379/93.01 |
| 5,905,781 | A | 5/1999 | McHale et al. | 379/93.14 |
| 6,044,107 | A * | 3/2000 | Gatherer et al. | 375/222 |
| 6,192,109 | B1 * | 2/2001 | Amrany et al. | 370/248 |
| 6,252,900 | B1 * | 6/2001 | Liu et al. | 375/219 |
| 6,292,539 | B1 * | 9/2001 | Eichen et al. | 379/1.04 |
| 6,304,595 | B1 * | 10/2001 | Pettersson et al. | 375/222 |
| 6,314,102 | B1 * | 11/2001 | Czerwiec et al. | 370/395.6 |
| 6,381,252 | B1 * | 4/2002 | Li et al. | 370/401 |

\* cited by examiner

| | | MODEM 1 | | MODEM 2 | | MODEM 3 | | MODEM 4 | | MODEM 5 | | MODEM 6 | | ... |
|---|---|---|---|---|---|---|---|---|---|---|---|---|---|---|
| | | UP | DOWN | UP | DOWN | UP | DOWN | UP | DOWN | UP | DOWN | UP | DOWN | |
| 213 | PACKET RATE (KMPS) | .062 | .437 | .112 | .875 | 0.42 | .398 | – | – | 0 | .125 | .100 | .176 | |
| 214 | BIT RATE (MBPS) | .5 | 3.5 | .9 | 7 | .4 | 3.2 | – | – | 0 | 1 | 0.7 | 1.3 | |
| 216 | ERROR RATE × $10^{-7}$ | 0.3 | 0.1 | 0.9 | 0.9 | 1.1 | 0.3 | – | – | 0.2 | 0.05 | 0.1 | 0.0 | |
| 218 | DATA RATE (MBPS) | .5 | 4 | 1 | 8 | .5 | 4 | 1 | 8 | .5 | 4 | 1 | 8 | |
| 220 | ADD | 80% | 75% | 85% | 85% | 70% | 75% | 90% | 95% | 85% | 90% | 75% | 75% | |
| 222 | REMOVE | 30% | 35% | 0% | 0% | 20% | 25% | 30% | 30% | 35% | 30% | 30% | 30% | |
| 224 | PRIORITY | 2 | | 1 | | 4 | | 6 | | 3 | | 5 | | |
| 226 | MIN UP (SEC) | 300 | | 600 | | 900 | | 1200 | | 900 | | 600 | | |
| 228 | TIME UP (SEC) | 103.7 | | 588.2 | | 137.6 | | – | | 43.2 | | 82.4 | | |
| 230 | PROPORTION'TY FACTOR | 0.25 | 0.25 | 0.5 | 0.5 | 0.33 | 0.33 | – | – | 0.25 | 0.25 | 0.67 | 0.67 | |
| 232 | SESSION | 1 | | 1 | | 2 | | – | | 1 | | 2 | | |
| 234 | ROUTING ADDRESS | **** | **** | **** | **** | **** | **** | – | – | **** | **** | **** | **** | |

76 — LOADING INFORMATION (213, 214, 216, 218)
78 — THRESHOLD INFORMATION (220, 222)
80 — OPERATING PARAMETERS (224, 226, 228, 230)
86 — SESSION INFORMATION (232, 234)

202, 204, 206, 208, 210, 212 — modem columns
202A/202B, 204A/204B, 206A/206B, 208A/208B, 210A/210B, 212A/212B — UP/DOWN sub-columns

DATA COMMUNICATION USING A MODIFIABLE NUMBER OF XDSL MODEMS

CROSS REFERENCE TO RELATED APPLICATION

This application is a continuation of U.S. application Ser. No. 08/951,151, filed Oct. 15, 1997, U.S. Pat. No. 5,999,565 by Robert H. Locklear, Jr., Craig S. Cantrell and Kip R. McClanahan and entitled "Data Communication Using a Modifiable Number of XDSL Modems."

TECHNICAL FIELD OF THE INVENTION

The invention relates in general to data communication, and more particularly to data communication using a modifiable number of XDSL modems.

BACKGROUND OF THE INVENTION

A communication server provides access to communication facilities. For example, a communication server having a bank of modems may provide subscriber access to the modems for data communication. A communication server may be associated with its own dedicated network or with an existing network, such as the public switched telephone network (PSTN).

As networks provide greater connectivity and access to information, there is an increasing demand for data communication at higher rates. For example, Internet sessions may require high data rates to accommodate multimedia information. One solution to provide increased data rates replaces existing twisted pair wiring with high bandwidth media, such as coaxial cable or fiber optic links. Other solutions adopt improved transmission techniques using the existing hardware infrastructure. For example, digital subscriber line (XDSL) technology provides higher bandwidth data service over existing twisted pair wiring.

Data rates supported by a single XDSL line may still be inadequate for demands. One solution involving integrated services digital network (ISDN) bundles multiple lines with the same data rate to increase data capacity for a session. However, this known technique lacks the flexibility or intelligence to provide reliable and economical high bandwidth data communication service using XDSL technology.

SUMMARY OF THE INVENTION

In accordance with the present invention, the disadvantages and problems associated with data communication have been substantially reduced or eliminated. The present invention provides a communication system that modifies the number of XDSL modems for communicating data in response to loading information and threshold information.

In accordance with one embodiment of the present invention, a communication system for communicating data associated with a session includes a number of twisted pair lines. A first communication device has a number of first XDSL modems coupled to the twisted pair lines. The first communication device communicates data associated with the session using the twisted pair lines. A second communication device has a number of second XDSL modems coupled to the twisted pair lines that communicate with the first XDSL modems. The second communication device determines the number of second XDSL modems for communicating data associated with the session based on loading information and corresponding threshold information of at least one of the second XDSL modems.

In accordance with another embodiment of the present invention, a communication device for communicating data associated with a session using a number of twisted pair lines includes a number of XDSL modems coupled to the twisted pair lines. The communication device also includes an interface and a router for communicating data between the interface and the second XDSL modems. A controller coupled to the XDSL modems and the router receives loading information from at least one of the XDSL modems, compares the loading information to stored threshold information, and determines the number of XDSL modems for communicating data associated with the session.

In accordance with another embodiment of the present invention, a method for communicating data using a number of XDSL modems coupled to a number of associated twisted pair lines includes: determining loading information of at least one XDSL modem; comparing the loading information to threshold information; and determining the number of XDSL modems for communicating data associated with a session in response to the comparison.

Still another embodiment of the present invention includes a method of segmenting a packet of data for communication by a number of XDSL modems, the method comprising: receiving a packet; determining the size of the packet; and segmenting the packet into subpackets based on proportionality factors associated with the XDSL modems to communicate the subpackets.

Important technical advantages of the present invention include a communication device that modifies the number of XDSL modems used in a session. The modification is accomplished by comparing loading information with corresponding threshold information associated with the data rate capacity of the XDSL modems. If the data rate increases to a predetermined percentage (e.g., 80%) of the capacity of an XDSL modem, the communication device requests service from another XDSL modem. Similarly, if the data rate decreases to a predetermined percentage (e.g., 30%) of the capacity of the XDSL modem and more than one XDSL modems are servicing the session, the communication device requests suspension or termination of service from a selected XDSL modem. The communication device may then support a session having a range of data rate needs while optimizing the use of a number of XDSL modems.

Another important technical advantage of the present invention includes the selection of lines based on a variety of characteristics and factors, such as: different upstream and/or downstream data rate capacities, varying times needed to prepare the line for data communication, cost to operate the lines, minimum billing increments for line usage, and other operational parameters. The communication device maintains an activity table to determine status information on twisted pair lines and XDSL modems. In one embodiment, the table contains information on the minimum time each modem should be active for efficient use, the actual time each modem has been in an active state, a priority rank for each modem, fixed and/or adjusted data rate capacity, threshold values to remove or add a modem, and loading information detailing current data rates (e.g., packet rate, bit rate, error rate).

Another important technical advantage of the present invention includes the segmenting of data in proportion to the data rate capacity of active modems. After receiving a data packet from a network, one embodiment of the present invention determines the packet size and then divides the packet into subpackets based on proportionality factors derived from the capacity of active modems serving the session. The communication device addresses the subpackets using virtual circuits supported by a suitable multipoint protocol. Proportionality factors may change dynamically with modifications to the number of modems in active use and adjustments in the current data rate capacity of the modems. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
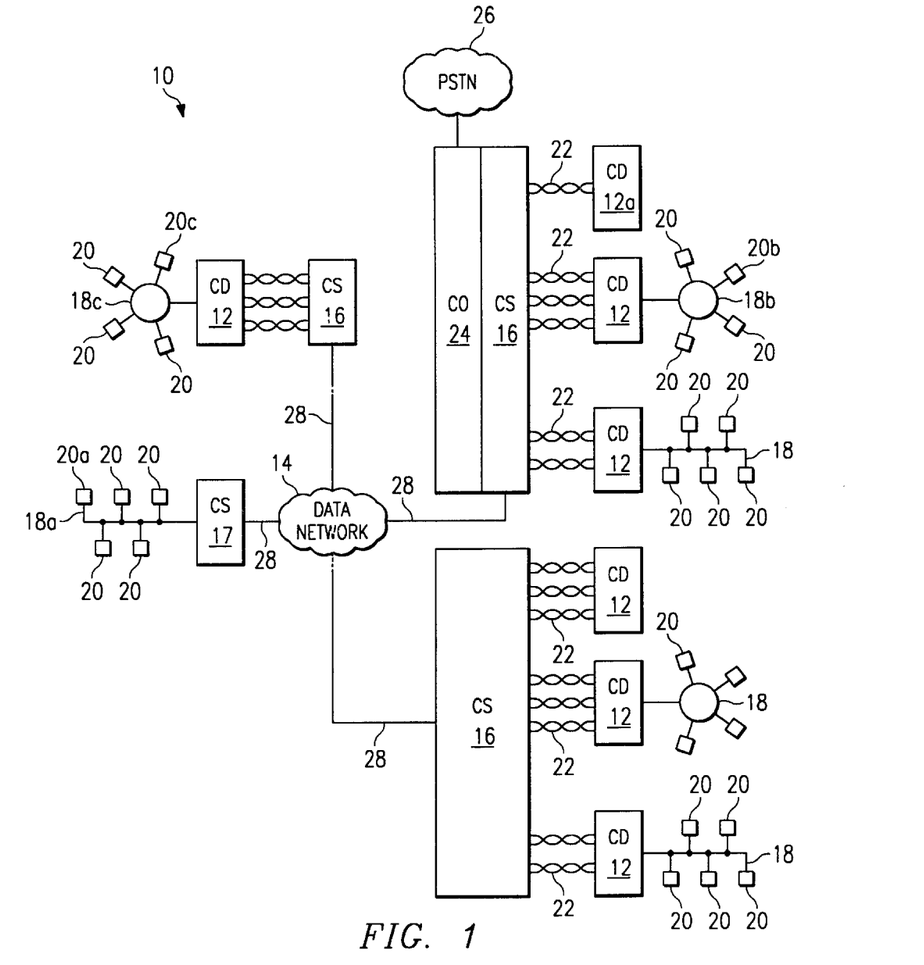
FIG. 1 illustrates a communication system in accordance with the present invention.

FIG. 1 illustrates a communication system 10 that includes a number of communication devices 12 coupled to a data network 14 using communication servers 16. In general, communication system 10 supports communication sessions between a variety of networks and devices using, at least in part, XDSL communication techniques. Specifically, information associated with a session passes between device 12 and server 16 using a modifiable number of XDSL modems and associated twisted pair lines 22. Throughout this description, device 12 and server 16 may be referred to generally as communication devices.

A variety of local area networks (LANs) 18 couple to devices 12. LAN 18 couples terminals 20. together for a variety of functions including communication among terminals 20. Terminals 20 include computers, workstations, printers, scanners, facsimile machines, or other computing or communicating devices that operate to communicate information using LAN 18. LAN 18 may be located at corporate or consumer premises, and serves a number of terminals 20. LAN 18 comprises a token ring, Ethernet, or other network or interconnection of terminals 20, and may also comprise a portion of a wide area network (WAN). LAN 18 supports Ethernet (10 Mbps), Fast Ethernet (100 Mbps), Gigabit Ethernet, switched Ethernet, fiber distributed data interface (FDDI), a synchronous transfer mode (ATM), or any other suitable networking protocol or technology. LAN 18 couples to data network 14 using server 16, device 12, or any suitable combination of server 16 and device 12.

Device 12 couples to server 16 using a number of twisted pair lines 22. Lines 22 may comprise wiring that is commonly installed at subscriber premises and as the local loop in many public switched telephone networks (PSTNs). Lines 22 may be unshielded twisted pair (UTP), shielded twisted pair (STP), or other suitable type or category of wiring made of copper or suitable conductive material. In one embodiment, device 12 and server 16 support high bandwidth data service in the local loop using asymmetric digital subscriber line (ADSL) technology, high bandwidth digital subscriber line (HDSL) technology, very high bandwidth digital subscriber line (VDSL) technology, or other suitable high bandwidth technology.

U.S. Pat. No. 5,668,857 describes in detail the architecture and operation of one embodiment of server 16, and is hereby incorporated by reference for all purposes. Server 16 may be located at a central office, remote terminal, or any other location that terminates twisted pair lines 22. Server 16 contemplates any number of couplings to devices 12 using any number of twisted pair lines 22. For example, server 16 may couple to a first device 12 using a single twisted pair line 22 and to a second device 12 using multiple twisted pair lines 22.

One embodiment of server 16 couples to a central office (CO) 24, which in turn couples to the public switched telephone network (PSTN) 26 to provide traditional plain old telephone service (POTS) or other networked communication services supported by PSTN 26. Server 16 may include an active or passive splitter or other device to provide a voice path to PSTN 26 through CO 24 and a data path to data network. 14. Using frequency division multiplexing or other suitable technique, server 16 provides simultaneous voice and data service to device 12.

Server 16 couples to data network 14 which, depending on the embodiment, supports a synchronous transfer mode (ATM), frame relay, X.25, or other suitable data communication protocol or technology. Data network 14 couples one or more servers 16 for communicating data to and from a number of LANs 18. Data links 28 between server 16 and data network 14 may be T1, T3, E1, E3, or other high bandwidth links using wireline or wireless techniques.

A particular embodiment of server 16, designated server 17, couples terminals 20 serviced by LAN 18a to data network 14 without the use of twisted pair lines 22. Server 17 includes appropriate protocols to support virtual channels and multiple communication paths between itself and devices 12 in communication system 10. For example, server 17 may support an ATM layer, a multilink point-to-point protocol layer, and an Internet Protocol (IP) layer to communicate with devices 12.

In operation, communication system 10 establishes a session for communicating data between one or more terminals 20 or devices 12 in communication system 10. For example, communication system 10 may establish a session between terminal 20a serviced by LAN 18a and terminal 20b serviced by LAN 18b. Communication for such a session would pass through one or more twisted pair lines 22 associated with device 12 servicing LAN 18b. Communication for a session between, for example, terminal 20c serviced by LAN 18c and device 12a would pass through one or more twisted pair lines 22 associated with device 12 servicing LAN 18c and one or more twisted pair lines 22 associated with device 12a. Also, communication system 10 supports communication between device 12 and/or terminal 20 and another device integral to or coupled to data network 14, such as server 17, an Internet server, an Internet service provider (ISP), a corporate server, an on-line service provider, or other high bandwidth communication device. The communication path for each session supported by communication system 10 includes at least one span of one or more twisted pair lines 22.

To initiate a session, terminal 20 serviced by LAN 18 sends a signal to device 12. Alternatively, device 12 initiates its own session without signaling from LAN 18 or terminal 20. Device 12 identifies one or more twisted pair lines 22 that are available to communicate data with server 16. For each twisted pair line 22 identified for the session, device 12 communicates a request for service to server 16. The request for service may comprise a digital off-hook signal that causes server 16 to select a modem in its modem pool. The off-hook detector at server 16 may monitor direct current voltages, electrical tones, data link frames, or any other protocol or data sequencing to determine whether device 12 needs data access. The off-hook detector in server. 16 may monitor electrical tones generated by a modem at device 12 while in the process of training, notching, equalizing, or performing any other task that puts electrical tones onto twisted pair lines 22. Server 16 may also detect frames or packets. These frames or packets could be Ethernet, ATM, HDLC, or any suitable data communications frame format. The off-hook detector in server 16 could also examine various protocols such as Transmission Control Protocol/Internet Protocol (TCP/IP), a multilink point-to-point protocol (PPP), or any other suitable network protocol or data stream.

Server 16 responds to the request for service by selecting an available modem in its modem pool, retrieving stored line characteristics, training the associated twisted pair line 22 for communication, and establishing XDSL communication protocols. Server 16 communicates an acknowledgment to device 12 during or upon establishment of XDSL communication. Server 16 then communicates a connect request message to data network 14, which is then propagated to the destination device 12 or terminal 20. Communication system 10 builds the communication path from originating device to destination device on a segment-by-segment basis using a series of connect request and acknowledgment messages.

Once the communication path is set up, the participating elements of communication system 10 operate to exchange information associated with a session. In a particular embodiment, the originating terminal 20 communicates data to device 12 using LAN 18. Device 12 converts the data into a protocol consistent with communication over twisted pair lines 22, and sends the data to server 16 over one or more active lines 22. Server 16 converts the data into a protocol consistent with -communication in data network 14, and sends the data using links 28 to data network 14. Data network 14 then communicates the data using links 28 to server 16 associated with the destination device 12, LAN 18, and/or terminal 20. Alternatively, data network 14 communicates the data to server 17 for delivery to a selected terminal 20 serviced by LAN 18a.

An important technical advantage of the present invention is the establishment and maintenance of a communication session that includes at least one segment of communication between server 16 and device 12 using a modifiable number of twisted pair lines 22. In a particular embodiment, device 12 and/or server 16 monitor the loading information on active modems associated with the session, compare the loading information to threshold information on the modems, and add or remove lines from active service as needed. Adding twisted pair line 22 to active service when data traffic is heavy and removing twisted pair line 22 from active service when data traffic is lower allows device 12 and server 16 to operate at higher bandwidths only when needed. Such operation optimizes the use of XDSL modems in device 12 and server 16.

Figure 2:
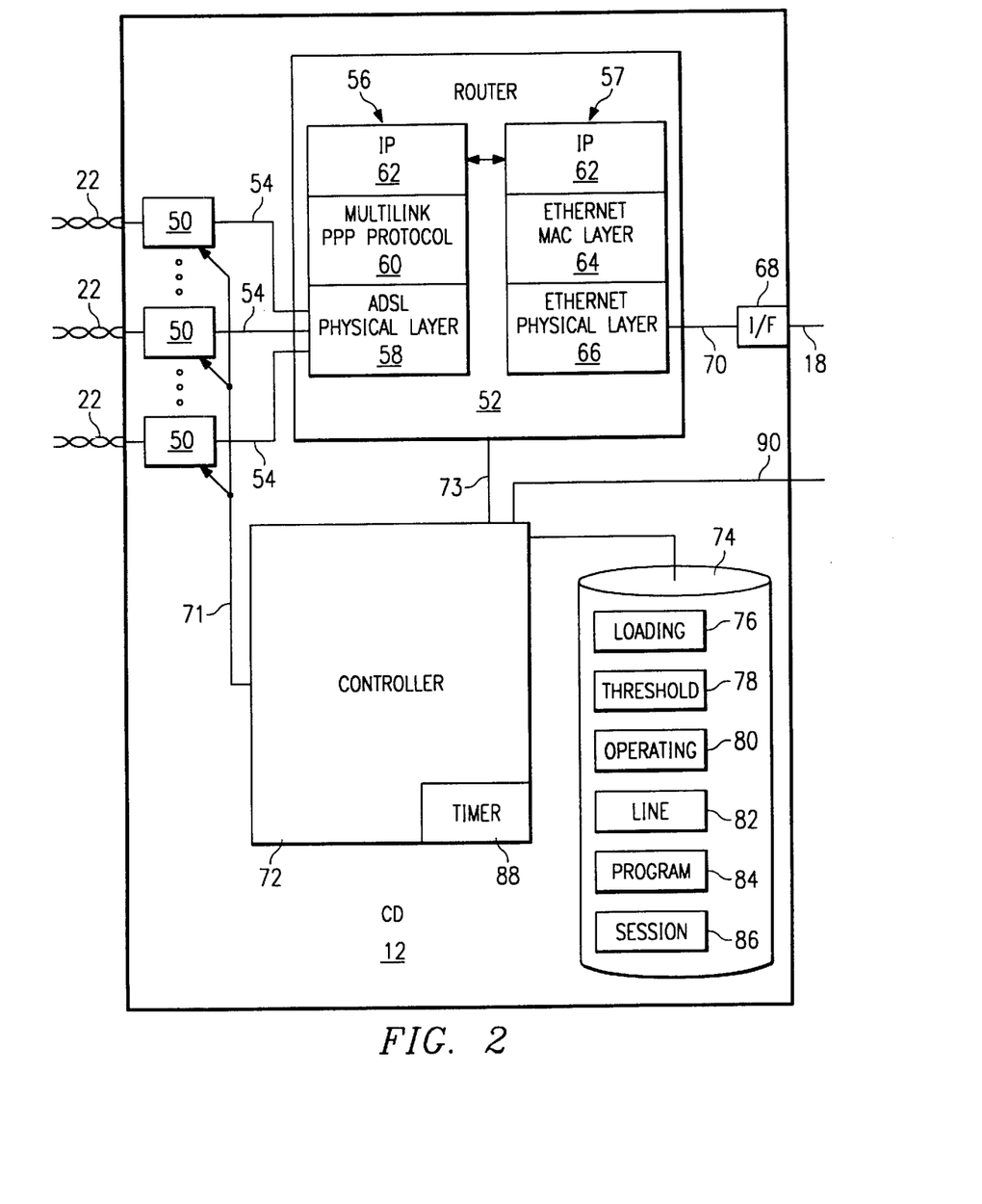
FIG. 2 illustrates in greater detail a communication device of the communication system of FIG. 1.

FIG. 2 illustrates in greater detail device 12 of communication system 10. Device 12 includes modems 50 coupled to twisted pair lines 22. Modems 50 transmit and receive data using any suitable digital subscriber line technology, such as ADSL, VDSL, or HDSL, referred to generally as XDSL. Each modem 50 includes an associated twisted pair line 22 and data line 54. In operation, modem 50 receives inbound or downstream communication from server 16 on twisted pair line 22, and places the resulting data in an appropriate protocol on data line 54 for delivery to router 52. Modem 50 also receives outbound or upstream communication on data line 54, and prepares the data for delivery to server 16 using twisted pair line 22.

Router 52 couples data lines 54 from modems 50 to a series of protocol layers. Protocol layers are arranged in a first stack 56 associated with XDSL communications and a second stack 57 associated with LAN communications. Router 52 performs open systems interconnect (OSI) model processing by passing data through protocol layers associated with stacks 56 and 57. Generally, router 52 supports any suitable number of protocols to allow communication between server 16 and LAN 18.

In a particular embodiment, lines 54 couple to a first physical layer 58, such as an ADSL physical layer, which in turn couples to an intermediate protocol layer 60, such as a multilink point-to-point protocol (PPP). A common protocol layer 62, such as an Internet Protocol (IP) layer, provides a common protocol between first stack 56 and second stack 57. Common protocol layer 62 in second stack 57 couples to an intermediate protocol layer 64, such as a media access controller (MAC) layer. Intermediate protocol layer 64 couples to a second physical layer 66, such as an Ethernet physical layer, which in turn couples to an interface 68 using line 70.

In a specific embodiment, intermediate protocol layer 60 supports multiple switched virtual circuits (SVCs) or permanent virtual circuits (PVCs). Using virtual circuits, device 12 can support a communication session that uses more than one modem 50. This is accomplished by servicing a session with two or more virtual circuits, where each virtual circuit is associated with modem 50 and its corresponding twisted pair line 22.

Interface 68 couples device 12 to LAN 18. Interface 68 supports any suitable technology or protocol that provides communication between LAN 18 and router 52. The selection and design of interface 68 may depend on the type or functionality of LAN 18, as well as the data service rate supported by LAN 18 and device 12. Also, in a particular embodiment where device 12 is not associated with LAN 18, interface 68 supports direct communication with components internal or external to device 12.

Figure 4:
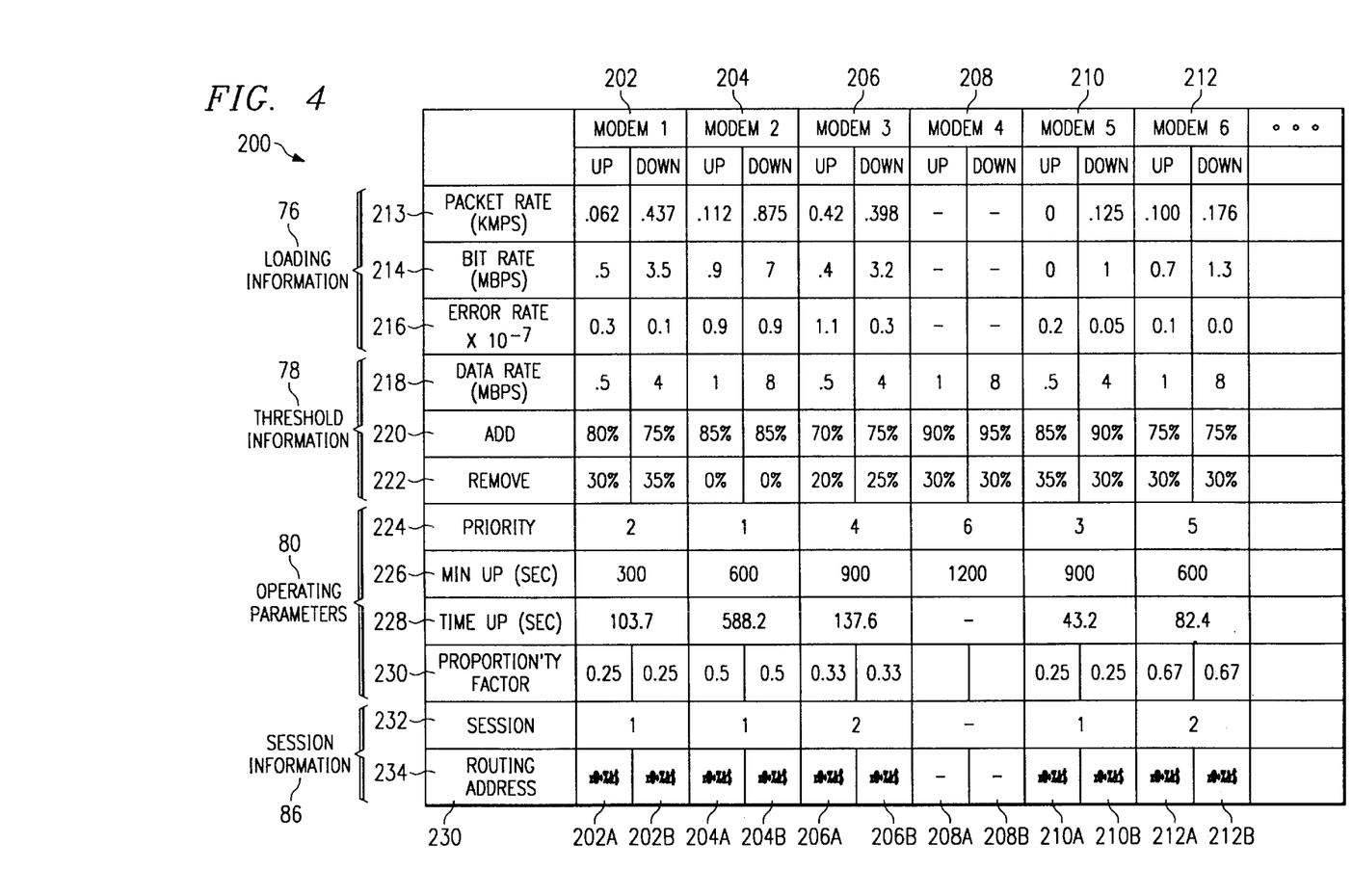
FIG. 4 is a table that includes loading information, threshold information, and operating parameters of modems in the communication system of FIG. 1.

Controller 72 accesses modems 50 using control line 71 and router 52 using control line 73. Controller 72 manages the overall operation of device 12 by collecting information from modems 50 and router 52, making decisions based on this information and other stored information; and directing the operation of components of device 12 in response to these decisions. Controller 72 also accesses database 74 to store, retrieve, and maintain loading information 76, threshold information 78, operating parameters 80, line information 82, program information 84, and session information 86. FIG. 4, discussed below, describes contents of database 74 in greater detail. Information shown in database 74 may reside in different components of device 12 or in components external to device 12. In one embodiment, controller 72 includes a timer 88 to manage the use of modems 50, as described below. Controller 72 may also couple to LAN 18 or other external components using line 90.

In operation, device 12 receives inbound or downstream data associated with a session on one or more modems 50 coupled to twisted pair lines 22, passes the data through protocol layers of router 52, and communicates the data through interface 68 to LAN 18. Device 12 also receives outbound or upstream data associated with the session from LAN 18 through interface 68, passes the data through protocol layers of router 52, and communicates the data through one or more modems 50 to twisted pair lines 22. During this process, controller 72 may also maintain loading information 76 and threshold information 78 in database 74 and compares loading information 76 to threshold information 78 to determine which modems 50 to activate or inactivate.

Controller 72 also maintains operating parameters 80, line information 82, program information 84, and session information 86 in database 74. Operating parameters 80 include modem priorities, minimum times to activate modems 50 for optimum use, and proportionality factors to perform data packet segmentation. Line information 82 may include amplitude, phase, timing, delays, impedance, and/or other data characterizing the electrical or physical properties of twisted pair lines 22. Program information 84 may include instructions, parameters, data, and other information used by controller 72. Session information 86 may include virtual circuit addresses and modem assignments for each session serviced by device 12.

Figure 3:
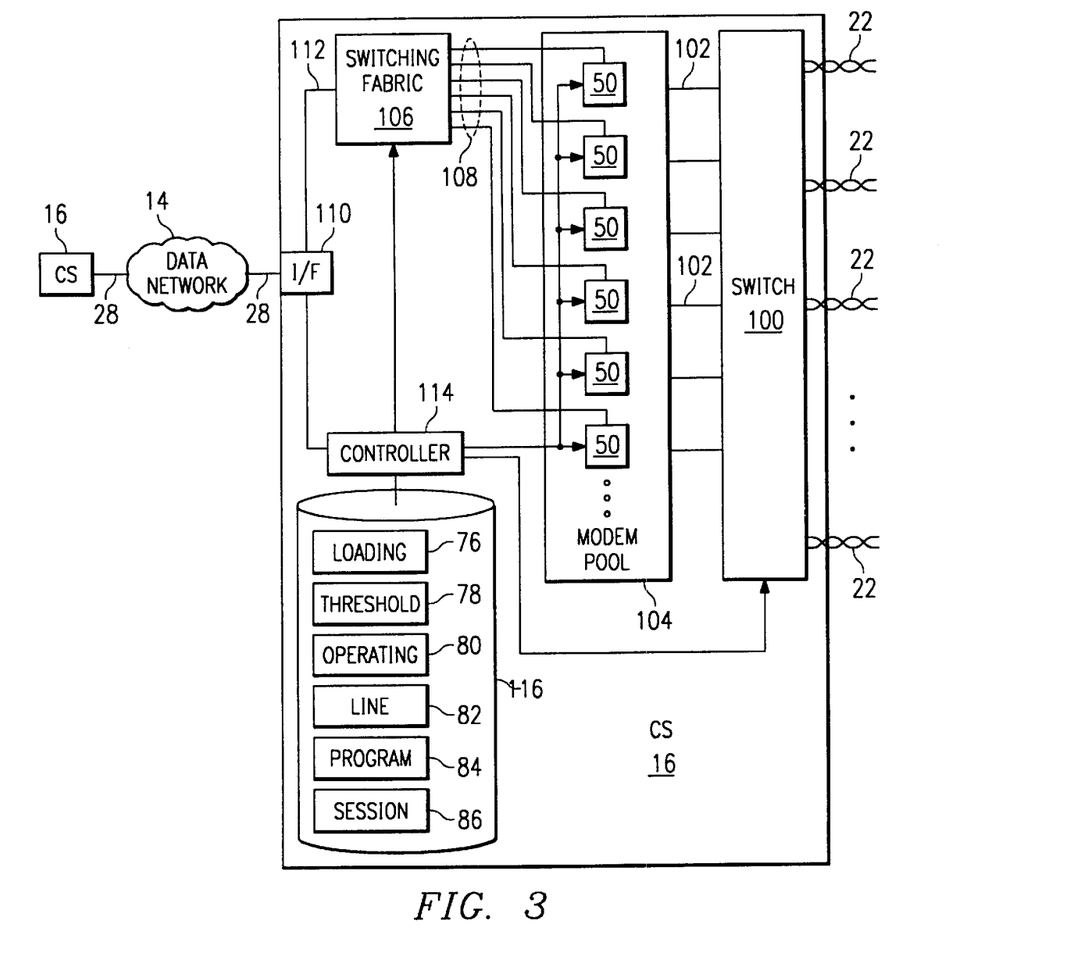
FIG. 3 illustrates in greater detail a communication server of the communication system of FIG. 1.

FIG. 3 illustrates in greater detail communication server 16 of communication system 10. Server 16 includes switch 100, which couples twisted pair lines 22 to modem pool 104 using lines 102. Modems 50 in modem pool 104 are of similar design and operation as modems 50 in device 12 and convert signals in an appropriate XDSL communication protocol into digital data in an appropriate digital protocol. Modems 50 pass the converted signals to a switching fabric 106 using lines 108. Switching fabric 106 may be any type of switch in hardware and/or software that communicates information between modems 50 and interface 110. As taught in U.S. Pat. No. 5,668,857, controller 114 directs switch 100 to couple a selected subset of twisted pair lines 22 to selected output lines 102 that couple to modems 50 in modem pool 104. Controller 114 also receives loading information 76 and threshold information 78 from modems 50 in modem pool 104.

Switching fabric 106. establishes a session and assigns an address (e.g., virtual path, virtual channel) to be used in future communications associated with the session.

Switching fabric 106 and/or controller 114 store session, address, and mapping information as session information 86 in database 116. For inbound or downstream communication, switching fabric 106 directs communications from data network 14 that include the address associated with the established session to an assigned or designated modem 50. For outbound or upstream communication, switching fabric 106 directs communications from active modems 50 in modem pool to data network 14. In one embodiment, switching fabric 106 is an a synchronous transfer mode (ATM) switching fabric which communicates data between modem pool 104 and interface 110 using line 112. Interface 110 includes hardware and/or software to support communication between data network 14 and switching fabric 106.

Controller 114 accesses switch 100, modem pool 104, switching fabric 106, and interface 110 to control the overall operation of server 16. Controller 114 also accesses database 116 to store, retrieve, and maintain loading information 76, threshold information 78, operating parameters 80, line information 82, program information 84, and session information 86. Information shown in database 116 may also reside in different components of server 16 or in components external to server 16. For example, switching fabric 106 may store locally one or more items shown in database 116.

In operation, server 16 receives inbound or downstream data associated with a session from data network 14 at interface 110 coupled to line 28, passes the data to one or more modems 50 in modem pool 104 servicing the session using switching fabric 106, and communicates the data from modems 50 to associated twisted pair lines 22 through switch 100. Server 16 also receives outbound or upstream data associated with the session on one or more modems 50 coupled to switch 100 and twisted pair lines 22, and passes the data through switching fabric 106 to interface 110 for transmission to data network 14. During this process, controller 114 may also maintain loading information 76 and threshold information 78 in database 116 and compares this loading information 76 to threshold information 78 to determine which modems 50 in modem pool 104 to activate or inactivate.

FIG. 4 is a table 200 which includes in more detail particular data contained at device 12 and/or server 16 of communication system 10. Table 200 may include loading information 76, threshold information 78, operating parameters 80, and session information 86 for each modem 50 of device 12 or server 16 to perform both inbound or downstream communication and outbound or upstream communication. Table 200 includes columns 202, 204, 206, 208, 210, and 212 that contain information on modems 1, 2, 3, 4, 5, and 6 respectively. Table 200 may include any number of columns to represent any number of modems 50 in device 12 or server 16. The following description refers to the operation of device 12, but applies to a similar operation performed at server 16.

Each column in table 200 contains two subcolumns: column A representing outbound or upstream data (i.e., data from device 12 to data network 14), and column B representing inbound or downstream data (i.e., data from data network 14 to device 12). For example, column 202 representing modem 1 comprises column 202A representing upstream information for modem 1, and column 202B representing downstream information for modem 1. Some information maintained in table 200 (e.g., modem priority 224, minimum time up 226, total time up 228, and session identifier 232) do not distinguish between upstream and downstream operation.

Loading information 76 in table 200 includes a packet rate 213, bit rate 214, and an error rate 216. Packet rate 213 may be expressed in thousands of messages per second (Kmps) and indicates the number of messages, packets, cells, or other grouping of information (referred to collectively as messages) communicated by modem 50 each second. Bit rate 214 may be expressed in millions of bits per second (Mbps) and indicates the number of bits communicated by modem 50 each second. Error rate 216 represents the number of errors or error bits divided by total bits communicated by modem 50. For example, error rate 216 may be expressed as the number of errors in the data for every $10^7$ bits received. A high error rate 216 may indicate malfunction or overtasking of modem 50. Threshold information 78 in table 200 includes a data rate 218, an add percentage 220, and a remove percentage 222. Data rate 218 may be expressed in millions of bits per second (Mbps) and indicates the maximum data rate capacity upstream and downstream for each modem 50. For download intensive applications (e.g., Internet browsing, remote computing), downstream data rates 218 are greater than upstream data rates 218. Modems 50 may adjust data rate 218 dynamically based on error rate 216, line quality, noise levels, or other factors. Add percentage 220 indicates the percentage of data rate 218 at which device 12 activates another modem 50 for the session. For example, if modem 2 (column 204) operating on a session alone maintains a downstream data rate 218 above 6.8 Mbps—calculated from the product of downstream data rate 218 (column 204B, row 218) of 8 Mbps and add percentage 220 (column 204B, row 220) of eighty-five percent—device 12 activates modem 1 (column 202). In similar fashion, remove percentage 222 indicates the percentage of data rate 218 at which device 12 deactivates modem 50.

Operating parameters 80 in table 200 include modem priority 224, a minimum time up 226, a total time up 228, and a proportionality factor 230. Modem priority 224 indicates the order in which device 12 activates modems 50 to service a session. Prioritization of modems 50 allows device 12 to activate modems in an efficient manner because, due to varying modem and line characteristics, not all modems 50 and associated lines 22 cost the same to activate and/or operate. Some modems 50 cost less to activate than others and are suitable for shorter periods of activity or for sporadic periods of activity. Other modems 50 may work better for large, constant data rates because the cost to activate and operate one high data rate modem 50 over an extended period of time may be less than activating and operating several low data rate modems 50.

Minimum time up 226 indicates the minimum time that modem 50 should stay active for efficient use. Total time up 228 indicates the total time that each modem 50 has been in an active state. Proportionality factor 230 indicates the proportion of data in a session that modem 50 communicates for both upstream and downstream communications. For example, a current session supported by device 12 uses three modems 50 (modems 1, 2, and 5 represented in columns 202, 204, and 210, respectively) for communicating data. Each proportionality factor 230 (upstream and downstream) represents the associated data rate 218 for each modem 50 divided by the sum of data rates 218 for all modems 50 servicing the same session. For example, in table 200, modem 2 has a data rate 218 of 1 Mbps upstream and 8 Mbps downstream, which is twice the corresponding data rates of 0.5 Mbps upstream and 4 Mbps downstream for modems 1 and 5. The sum of downstream data rates 218 for the three modems is 16 Mbps. Thus, the downstream proportionality factor 230 for modem 1 is downstream data rate 218 for modem 1 (4 Mbps) over the sum of downstream data rates 218 for the three modems (16 Mbps), or 0.25. Device 12 or server 16 may calculate upstream proportionality factor 230 in a similar manner.

Session information 86 in table 200 includes a session identifier 232 and a routing address 234. Session identifier 232 indicates the session currently serviced by modems 50 represented in table 200. For example, modems 1, 2, and 5 service a first session, and modems 3 and 6 service a second session. In this example, modem 4 remains unassigned to any particular session. Routing address 234 may comprise addresses or identifiers associated with switched virtual circuits (SVCs), permanent virtual circuits (PVCs), or other communication protocol that supports multipoint capabilities. In a particular embodiment, each modem 50 represented in table 200 maintains routing addresses 234 for both upstream and downstream communications.

Figure 5:
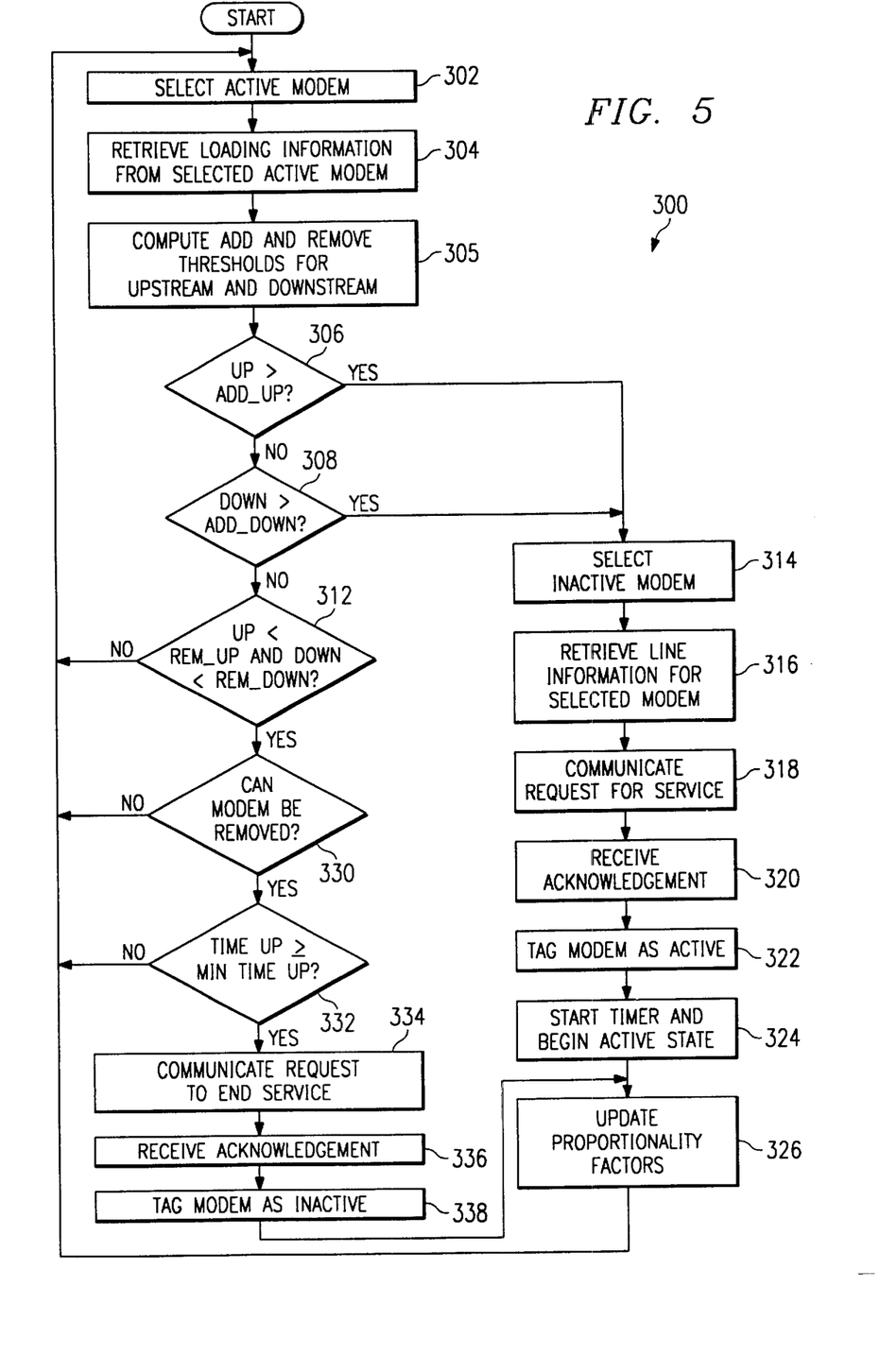
FIG. 5 is a flowchart of a method for modifying the number of modems for communicating data in response to loading information and threshold information.

FIG. 5 is a flowchart 300 depicting a method for modifying the number of modems 50 for communicating data in a session based on loading information 76 and threshold information 78. Although the following discussion describes flowchart 300 with respect to device 12, server 16 may perform a similar method. Communication system 10 contemplates device 12, server 16, or both performing the load balancing operations described in flowchart 300.

Flowchart 300 begins at step 302 where device 12 selects an active modem 50 associated with a current communication session supported by device 12. Device 12 then retrieves loading information 76 from selected modem 50 in step 304. Device 12 may operate on this loading information 76 immediately, or maintain this loading information 76 in database 74 for later use. Device 12 computes a downstream add threshold (ADD_DOWN), an upstream add threshold (ADD_UP), a downstream remove threshold (REM_DOWN), and an upstream remove threshold (REM_UP) at step 305 as follows:

ADD_DOWN=downstream add percentage 220 * downstream data rate 218;

ADD_UP=upstream add percentage 220 * upstream data rate 218;

REM_DOWN=downstream remove percentage 222 * downstream data rate 218; and

REM_UP=upstream remove percentage 222 * upstream data rate 218.

Device 12 performs steps 306–312 to determine whether there is a need to activate another modem 50 or deactivate the selected modem 50. Device 12 compares upstream loading information 76 (UP) to ADD_UP at step 306 and downstream loading information 76 (DOWN) to ADD_DOWN at step 308. UP may comprise any measure of the upstream loading of the selected modem 50, such as packet rate 213, bit rate 214, and error rate 216 in columns 202A, 204A, 206A, etc. Similarly, DOWN may comprise any measure of the downstream loading of the selected modem 50, such as packet rate 213, bit rate 214, and error 216 in columns 202B, 204B, 206B, etc.

If either threshold is exceeded as determined at steps 306 or 308, device 12 selects an inactive modem 50 at step 314 and accesses corresponding line information 82 stored in database 74 to train the associated twisted pair line 22 in preparation for communication at step 316. Before, during, or after training twisted pair line 22, the selected inactive modem 50 communicates a request for service to server 16 at step 318, and receives an acknowledgment at step 320. In a particular embodiment, server 16 communicates an acknowledgment to device 12 upon determining loading characteristics of modems 50 in modem pool 104, selecting an available modem 50, establishing a connection using switch 100 and twisted pair line 22 between the available modem 50 at server 16 and the selected modem 50 at device 12, and successfully training twisted pair line 22 to support communication. Upon receiving an acknowledgment that server 16 can support communication on the selected modem 50, device 12 tags the selected modem 50 as active at step 322 and starts timer 88 at step 324, marking the start of active state. Device 12 updates proportionality factors 230 at step 326 to reflect the addition of modem 50 to service the session, and flowchart 300 proceeds to step 302.

If neither threshold is exceeded in steps 306 and 308, device 12 compares upstream loading information 76 (UP) to REM_UP and downstream loading information 76 (DOWN) to REM_DOWN at step 312. If both threshold floors are met at step 312, device 12 determines whether it may remove the selected modem 50 or another modem 50 servicing the session at step 330. The determination of which modem to remove may depend on modem priority 224, data rate 218, or other factors. The determination of the appropriate modem to be removed or deactivated at step 330 also contemplates the situation where the selected modem 50 is the only remaining modem servicing the session, and therefore will not be removed before session termination. If total time up 228 for modem 50 to be deactivated is greater than or equal to minimum time up 226 at step 332, modem 50 communicates a request to end modem service at step 334. Upon receiving an acknowledgment from server 16 at step 336, device 12 tags modem 50 as inactive at step 338. Device 12 updates proportionality factors 230 at step 326 to reflect the removal of modem 50, and flowchart 300 proceeds to step 302.

Figure 6:
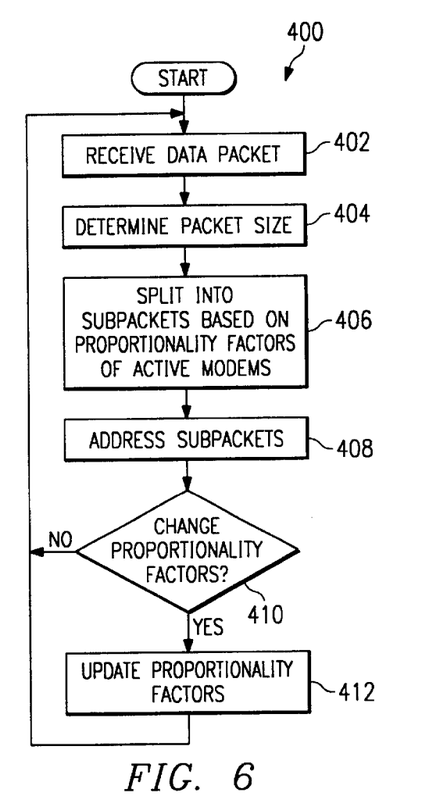
FIG. 6 is a flowchart of a method for segmenting a data packet in the communication system of FIG. 1.

FIG. 6 is a flowchart 400 depicting a method for segmenting a data packet into subpackets for communication by modems 50. The data packet may comprise any organization of information received by device 12 for upstream communication over two or more twisted pair lines 22. The techniques performed in flowchart 400 may be implemented in protocol layers supported by router 52, controller 72, or a combination of operations between router 52 and controller 72. Although the following discussion describes flowchart 400 with respect to device 12, server 16 may perform a similar method.

Flowchart 400 begins at step 402 where device 12 receives a data packet. Device 12 then determines the packet size at step 404 and segments the data packet into subpackets based on proportionality factors 230 of active modems 50 at step 406. Referring to the example illustrated by table 200 of FIG. 4, device 12 would split a data packet associated with session one into three different subpackets for communication by modems 1, 2, and 5. If the packet size is one thousand bytes, then device 12 would split the data packet into a first subpacket of two hundred and fifty bytes for communication by modem 1, a second subpacket of five hundred bytes for communication by modem 2, and a third subpacket of two hundred and fifty bytes for communication by modem 5. Device 12 addresses the subpackets for communication at step 408 by respective modems 50. During operation of device 12, proportionality factors 230 may change due to the addition and/or removal of modems 50 and the. modification of data rates 218 supported by modems 50, as indicated at step 410. If proportionality factors 230 change, device 12 updates proportionality factors 230 at step 412 in preparation for receiving the next data packet.

Figure 7:
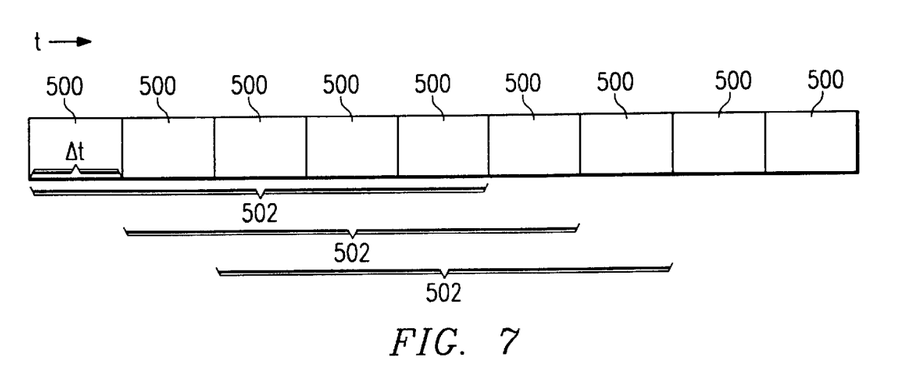
FIG. 7 is a diagram illustrating a particular method for determining a data rate in the communication system of FIG. 1.

FIG. 7 is a diagram illustrating a particular method for determining loading information 76 (e.g., packet rate 213, bit rate 214, error rate 216, etc.) for modem 50 in communication system 10. Device 12 and/or server 16 may adopt this method for both upstream and downstream communications. The following description illustrates the technique to determine downstream loading information 76 for modem 50 in device 12.

Controller 72 in device 12 retrieves downstream loading information 76 of modem 50 over a number of successive intervals 500. Each interval 500 corresponds to loading information 76 experienced by modem 50 over a particular interval of time Δt. Loading information 76 gathered by controller 72 for each interval 500 may comprise packet rate 213, bit rate 214, error rate 216, or other loading measure that represents the peak, average, or other measure of activity of modem 50 during interval 500.

Controller 72 then groups intervals 500 into windows 502. Each window 502 represents a suitable combination of loading information 76 over a predetermined number of intervals 500. Controller 72 generates successive windows 502 of loading information 76 by shifting in time the grouping of intervals 500 for each successive window 502. This "sliding window" technique allows controller 72 to add or remove modems 50 based on trends in loading information 76. For example, controller 72 may determine whether to add or remove a modem based on whether the average and/or maximum loading information 76 gathered for each interval 500 in window 502 exceeds or falls below threshold information 78. Controller 72 may also require a succession of windows 502 to indicate the desire to add or remove modems 50.

Although the present invention has been described in several embodiments, a myriad of changes, variations, alterations, transformations and modifications may be suggested to one skilled in the art, and it is intended that the present invention encompass such changes, variations, alterations, transformations and modifications as fall within the spirit and scope of the appended claims.

What is claimed is:

1. Communication control software for communicating data using a plurality of XDSL modems, the software embodied in a computer readable medium and operable to:
   determine loading information of at least one of a plurality of XDSL modems coupled to a plurality of associated twisted pair subscriber lines;
   compare the loading information to threshold information; and
   determine the number of XDSL modems for communicating data associated with a session in response to the comparison.

2. The communication control software of claim 1, further operable to determine the number of XDSL modems for communicating data associated with a session by:
   adding an XDSL modem if the loading information exceeds corresponding threshold information; and
   removing an XDSL modem if the loading information falls below corresponding threshold information.

3. The communication control software of claim 1, wherein the loading information and corresponding threshold information for each XDSL modem further comprises:
   a downstream data rate for data received by the XYDSL modem;
   an upstream data rate for data communicated by the XDSL modem;
   an upstream add threshold for comparison to the upstream data rate;
   an upstream remove threshold for comparison to the upstream data rate;
   a downstream add threshold for comparison to the downstream data rate; and
   a downstream remove threshold for comparison to the downstream data rate.

4. The communication control software of claim 1, wherein the loading information further comprises a packet rate, a bit rate, or an error rate.

5. The communication control software of claim 1, further operable to determine the number of XDSL modems for communicating data associated with a session by:
   adding an XDSL modem if an upstream data rate exceeds an upstream add threshold or a downstream data rate exceeds a downstream add threshold; and
   removing an XDSL modem if the upstream data rate falls below an upstream remove threshold and the downstream data rate falls below a downstream remove threshold.

6. The communication control software of claim 1, wherein the plurality of XDSL modems are located at a central office.

7. The communication control software of claim 1, wherein the number of XDSL modems is less than the number of twisted pair subscriber lines.

8. Communication control software for segmenting a packet of data, the software embodied in a computer readable medium and operable to:

receive a packet;

determine the size of the packet;

segment the packet into a plurality of subpackets based on a plurality of proportionality factors associated with a plurality of XDSL modems; and communicate the subpackets using the XDSL modems.

9. The communication control software of claim 8, further operable to address the subpackets to different destinations to support communication using a multilink point-to-point protocol.

10. The communication control software of claim 8, further operable to modify the proportionality factors in response to a modification in the number of XDSL modems used to communicate the subpackets.

11. The communication control software of claim 8, further operable to modify the proportionality factors in response to a change in the data rate of an XDSL modem.

12. The communication control software of claim 8, wherein the proportionality factors for each XYDSL modem further comprise:

an upstream proportionality factor; and a downstream proportionality factor.

13. The communication control software of claim 8, wherein each proportionality factor comprises a ratio between the data rate of its associated XDSL modem and the sum of data rates of the XDSL modems.

14. A device for communicating a packet of data in subpackets, comprising:

a plurality of XDSL modems;

an interface;

a link for communicating data between the interface and the XDSL modems; and a controller coupled to the link, wherein the controller segments a packet received from the interface into a plurality of subpackets and distributes the subpackets among a selected group of the XDSL modems.

15. The device of claim 14, wherein the controller is further operable to determine the size of the packet, segment the packet into a plurality of subpackets based on a plurality of proportionality factors associated with the XDSL modems, and distribute the subpackets among the selected group of the XYDSL modems based on the proportionality factors.

16. The device of claim 15, wherein the controller is further operable to modify the proportionality factors in response to a modification in the number of XDSL modems in the selected group of the XDSL modems.

17. The device of claim 15, wherein the controller is further operable to modify the proportionality factors in response to a change in the data rate of an XDSL modem.

18. The device of claim 15, wherein the proportionality factors for each XDSL modem further comprise:

an upstream proportionality factor; and a downstream proportionality factor.

19. The device of claim 15, wherein each proportionality factor comprises a ratio between the data rate of its associated XDSL modem and the sum of data rates of the selected group of the XDSL modems.

20. The device of claim 14, wherein the link comprises a router for communicating data between the interface and the XDSL modems using open systems interconnect (OSI) model processing.

21. The device of claim 14, wherein the link comprises a switching fabric operable to:

communicate data received from the XDSL modems to the interface; and communicate data received from the interface to a subset of the XDSL modems based on mapping information.

22. The device of claim 14, further comprising a switch coupled to the plurality of XDSL modems and a plurality of twisted pair lines, the switch operable to couple selected twisted pair lines to the XDSL modems.

23. The device of claim 14, wherein the controller is further operable to address the subpackets to different destinations to support communication using a multilink point-to-point protocol.

24. The device of claim 14, wherein the controller is further operable to address each subpacket to a different switched circuit.

25. The device of claim 14, wherein the selected group of the XDSL modems comprises at least two of the XDSL modems, and the selected group of the XDSL modems communicates data associated with a session.

* * * * *